(12) United States Patent
Tangi et al.

(10) Patent No.: US 6,729,569 B2
(45) Date of Patent: May 4, 2004

(54) REEL HUB LOCK RELEASING MECHANISM

(75) Inventors: Yoshinori Tangi, Hachiouji (JP); Eiichi Yoneyama, Atsugi (JP); Kazuya Tamura, Isehara (JP); Hiromi Inoguchi, Chofu (JP)

(73) Assignee: Mitsumi Electric Co., Ltd., Tokyo (JP)

( * ) Notice: Subject to any disclaimer, the term of this patent is extended or adjusted under 35 U.S.C. 154(b) by 0 days.

(21) Appl. No.: 10/271,160

(22) Filed: Oct. 15, 2002

(65) Prior Publication Data

US 2003/0071156 A1 Apr. 17, 2003

(30) Foreign Application Priority Data

Oct. 16, 2001 (JP) ........................................ 2001-318491

(51) Int. Cl.$^7$ .............................................. G11B 23/04
(52) U.S. Cl. ...................................... 242/338.1; 360/95
(58) Field of Search ........................ 242/338.1; 360/95, 360/137

(56) References Cited

U.S. PATENT DOCUMENTS

| | | | |
|---|---|---|---|
| 5,414,585 A | 5/1995 | Saliba | |
| 5,793,574 A | 8/1998 | Cranson et al. | |
| 5,857,634 A | 1/1999 | Hertrich | |
| 5,862,014 A | 1/1999 | Nute | |
| 6,241,171 B1 | 6/2001 | Gaboury | |

FOREIGN PATENT DOCUMENTS

| | | |
|---|---|---|
| JP | 2000-100025 A | 4/2000 |
| JP | 2000-100116 A | 4/2000 |
| JP | 2000-149491 A | 5/2000 |
| WO | WO 86/07295 A1 | 12/1986 |
| WO | WO 86/07471 A1 | 12/1986 |

*Primary Examiner*—John Q. Nguyen
(74) *Attorney, Agent, or Firm*—Frishauf, Holtz, Goodman & Chick, P.C.

(57) ABSTRACT

In a reel hub releasing mechanism, a seesaw type release lever is arranged so as to be turnable with its central part as a fulcrum, and it includes first and second flat members extending onto both sides from the fulcrum. The first flat member has an engaging protrusion at its distal end, while the second flat member has at its distal end a lever manipulating protrusion which protrudes upwards in order to manipulate a lock lever. A tape cartridge is formed with a window for snugly inserting the lever manipulating protrusion. When the lever manipulating protrusion abuts against the lock lever through the window, the operation of releasing reel hub lock is effected, and the tape cartridge is positioned so that the position of the window in the direction of inserting the tape cartridge into the slot of a tape drive may become substantially equal to the position of the lever manipulating protrusion in the inserting direction. It is accordingly possible to provide that reel hub lock mechanism of the tape drive which can position the tape cartridge simultaneously with the release of the reel hub lock, without separately forming any positioning part, and the tape drive which comprises the reel hub lock mechanism.

4 Claims, 10 Drawing Sheets

REEL HUB LOCK RELEASING MECHANISM

BACKGROUND OF THE INVENTION

This invention relates to a linear tape storage system represented by DLT (Digital Linear Tape) or LTO (Linear Tape Open) and, in particular, to a reel hub lock releasing mechanism for use in the system.

A linear tape storage system of the type has been developed as a backup for a computer system. A variety of linear tape storage systems have heretofore been proposed. For example, a digital linear tape drive as the DLT is disclosed in U.S. Pat. No. 5,862,014.

The digital linear tape drive (hereinafter may simply be called the "drive" or the "tape drive") is adapted to receive a tape cartridge (hereinafter may simply be called the "cartridge") having a single reel (supply reel). The digital linear tape drive includes a take-up reel in the interior thereof. When the tape cartridge is loaded in the drive, a magnetic tape is pulled out from the tape cartridge and is taken up by the take-up reel through a head guide assembly (HGA). The head guide assembly serves to guide to a magnetic head the magnetic tape (hereinafter may simply be called "tape") pulled out from the tape cartridge. The magnetic head exchanges information to and from the tape.

The head guide assembly is also called a "tape guide assembly" and is disclosed, for example, in U.S. Pat. No. 5,414,585. Besides, an example of the guide rollers is disclosed in Japanese Unexamined Patent Publication No. 2000-100025.

In general, a tape drive includes a generally rectangular having a common base, as stated in U.S. Pat. No. 5,793,574 by way of example. The base has two spindle motors (reel motors). The first spindle motor (reel motor) has a permanently mounted spool (take-up reel) permanently mounted to the base and dimensioned to accept a magnetic tape streaming at a relatively high speed. The second spindle motor (reel motor) is adapted to receive a removable tape cartridge. The removable tape cartridge is manually or automatically inserted into the drive via a slot formed on the housing of the drive. When the tape cartridge is inserted into the slot, the cartridge is engaged with the second spindle motor (reel motor). Prior to rotation of the first and the second spindle motors (reel motors), the tape cartridge is connected to the permanently mounted spool (take-up reel) by means of a mechanical buckling mechanism. A number of rollers (guide rollers) are located between the tape cartridge and the permanently mounted spool and guide the magnetic tape as it streams at a relatively high speed back and forth between the tape cartridge and the permanently mounted spool.

The digital linear tape drive of the above-mentioned structure requires a pulling device which allows the take-up reel to pull the tape from the supply reel. Such a pulling device is disclosed, for example, in International Publication No. WO86/07471. According to the disclosure in the publication, the take-up reel is provided with take-up leader means (first tape leader) coupled thereto. To the tape on the supply reel, supply leader means (second tape leader) is fixed. The first tape leader has a tab formed at its one end. The second tape leader has a locking hole. The tab is engaged with the locking hole.

Furthermore, a mechanism for joining the first tape leader to the second tape leader is required. Such a joining mechanism is disclosed, for example, in International Publication No. WO86/07295.

Japanese Unexamined Patent Publication No. 2000-100116 discloses "Structure of Leader Tape Engaging Part" capable of locking an end of a leader tape (second tape leader) to a tape end hooking part of the tape cartridge without requiring a tab protruding on a lateral side of the leader tape.

U.S. Pat. No. 5,857,634 discloses a lock system for preventing the rotation of the take-up reel of the tape drive when the tape cartridge is not inserted into the drive.

On the other hand, Japanese Unexamined Patent Publication No. 2000-149491 discloses an example of the tape cartridge to be loaded in the digital linear tape drive.

U.S. Pat. No. 6,241,171 discloses a "tape drive" in which a tape leader is urged from a tape cartridge to a take-up reel without using a buckling mechanism or a take-up leader.

The tape drive further includes a magnetic tape head actuator assembly. The magnetic tape head actuator assembly is located between the take-up spool and the tape cartridge along a tape path defined by a plurality of rollers. During operation, the magnetic tape streams back and forth between the take-up spool and the tape cartridge, coming into close proximity to the magnetic head actuator assembly while streaming along the defined tape path. An example of the magnetic head actuator assembly is disclosed in U.S. Pat. No. 5,793,574 mentioned above.

Meanwhile, as disclosed in Japanese Unexamined Patent Publication No. 2000-149491 mentioned above, the tape cartridge has a case, and a rotary reel or a supply reel which is rotatably accommodated in the case and around which a magnetic tape capable of carrying out recording/reproduction is wound. With such a tape cartridge, the rotational drive of the supply reel needs to be hindered in a state where the tape cartridge is not inserted in the slot of the tape drive. Otherwise, such a drawback might occur that, when the tape cartridge is being carried by way of example, the supply reel rotates in the tape cartridge, so the magnetic tape issues out of the tape cartridge. Therefore, the tape cartridge includes a reel hub lock mechanism for locking the reel hub of the supply reel. Such lock of the reel hub of the supply reel is called "reel hub lock" in the pertinent field. That is, in the state where the tape cartridge is not inserted in the slot of the tape drive, it is held in a state where the reel hub of the supply reel is locked by the reel hub lock mechanism. A reel hub lock releasing mechanism includes a lock lever for making the reel hub lock releasable through an external manipulation.

On the other hand, the tape drive requires a mechanism for releasing the reel hub lock by manipulating the lock lever when or after the tape cartridge has been inserted into the slot. Such a mechanism is called "reel hub lock releasing mechanism". More specifically, the tape drive has a loading mechanism for bringing the supply reel into engagement with a supply reel motor after the tape cartridge has been inserted into the slot. The loading mechanism has a loading motor which is arranged on a chassis, and a ring cam which is driven by the loading motor. The ring cam is coaxial with the rotary shaft of the supply reel motor, it is rotatably arranged between the rear surface of the chassis and the supply reel motor, and it has a cam groove. The reel hub lock releasing mechanism has an engaging protrusion which engages with the cam groove of the ring cam. Besides, the reel hub lock releasing mechanism releases the reel hub lock by manipulating the lock lever in response to the turning of the ring cam when the tape cartridge has been inserted into the slot.

The lever manipulating protrusion of a release lever in the reel hub lock mechanism in the prior art engages with the lock lever through a square window which is provided so as to open near one side of the bottom of the tape cartridge. Such a tape cartridge has the release lever of the reel hub lock mechanism located on the drive side so as to prevent the tape from loosening during non-operation. Separately from the release lever, the tape cartridge includes a part for positioning itself.

In the prior-art reel hub lock mechanism, a large gap exists between the release lever and the window of the tape cartridge. In releasing the lock by the use of the release lever, therefore, the tape cartridge moves undesirably. This signifies the disadvantage that, unless the tape cartridge is positioned by the separate part, its position becomes unstable.

SUMMARY OF THE INVENTION

It is accordingly an object of this invention to provide that reel hub lock mechanism of a tape drive which can position a tape cartridge simultaneously with the release of reel hub lock without separately forming any positioning part.

According to an aspect of this invention, there is provided a reel hub lock releasing mechanism for a tape drive which has supply reel drive means for rotationally driving a supply reel included in a tape cartridge inserted into a slot and a loading mechanism connected to the supply reel drive means. The loading mechanism drives a ring cam after the tape cartridge has been inserted into the slot. The reel hub lock releasing mechanism makes a reel hub lock of the supply reel release so as to become rotatable when the tape cartridge has been inserted into the slot and comprises a lock lever disposed in the tape cartridge for making the reel hub lock releasable through an external manipulation and a seesaw type release lever arranged so as to be turnable with its central part as a fulcrum and including first and second flat members extending onto both sides from the fulcrum. The lock lever is manipulated in response to turning of the ring cam when the tape cartridge has been inserted into the slot. The first flat member has an engaging protrusion at its distal end, while the second flat member has at its distal end a lever manipulating protrusion which protrudes upwards in order to manipulate the lock lever. The tape cartridge is formed with a window for snugly inserting the lever manipulating protrusion. The lever manipulating protrusion abuts against the lock lever through the window, thereby to perform the lock releasing operation, and to simultaneously position the tape cartridge so that a position of the window in a direction of inserting the tape cartridge into the slot may become substantially equal to a position of the lever manipulating protrusion in the inserting direction.

According to another aspect of this invention, there is provided a tape drive which has a reel hub lock releasing mechanism including supply reel drive means for rotationally driving a supply reel included in a tape cartridge inserted into a slot and a loading mechanism connected to the supply reel drive means for driving a ring cam after the tape cartridge has been inserted into the slot. The reel hub lock releasing mechanism makes a reel hub lock of the supply reel release so as to become rotatable when the tape cartridge has been inserted into the slot and comprises a lock lever disposed in the tape cartridge for making the reel hub lock releasable through an external manipulation. The lock lever is manipulated in response to turning of the ring cam when the tape cartridge has been inserted into the slot.

In the aspect of this invention, the reel hub releasing mechanism comprises a seesaw type release lever arranged so as to be turnable with its central part as a fulcrum. The seesaw type relese lever includes first and second flat members extending onto both sides from the fulcrum. The first flat member has an engaging protrusion at its distal end, while the second flat member has at its distal end a lever manipulating protrusion which protrudes upwards in order to manipulate the lock lever. The tape cartridge is formed with a window for snugly inserting the lever manipulating protrusion. The lever manipulates protrusion abutting against the lock lever through the window, thereby to perform the lock releasing operation, and to simultaneously position the tape cartridge so that a position of the window in a direction of inserting the tape cartridge into the slot may become substantially equal to a position of the lever manipulating protrusion in the inserting direction.

DESCRIPTION OF THE PREFERRED EMBODIMENT

Before describing an embodiment of this invention, a reel hub lock mechanism in the prior art will be explained with reference to FIGS. 1 through 3 in order to facilitate understanding of this invention.

Figure 1:
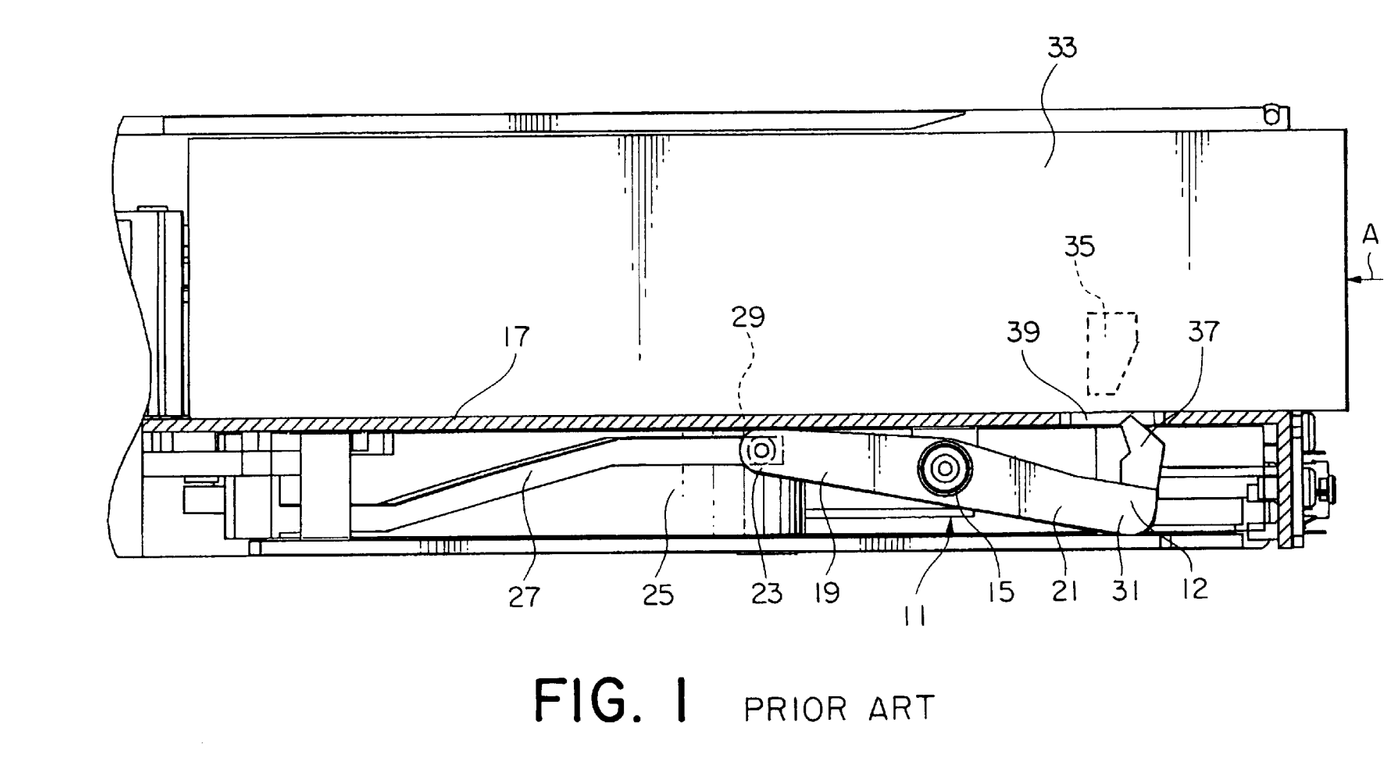
FIG. 1 is a sectional view showing the state of a reel hub lock releasing mechanism in the case where a reel hub lock mechanism in the prior art is in a reel hub locking state.
Figure 2:
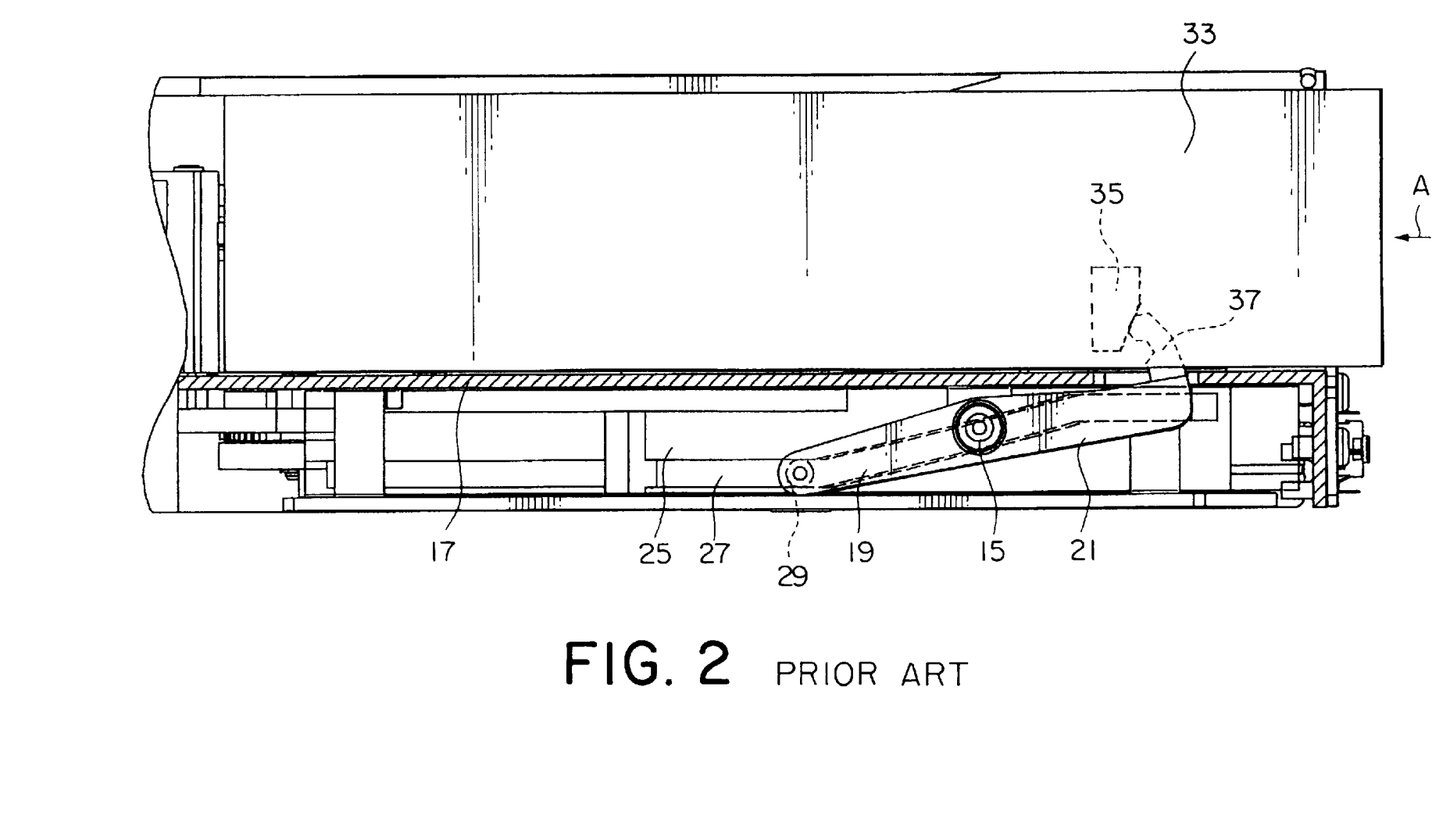
FIG. 2 is a sectional view showing the state of the reel hub lock releasing mechanism in the case where the prior-art reel hub lock mechanism is in a reel hub lock releasing state.
Figure 3:
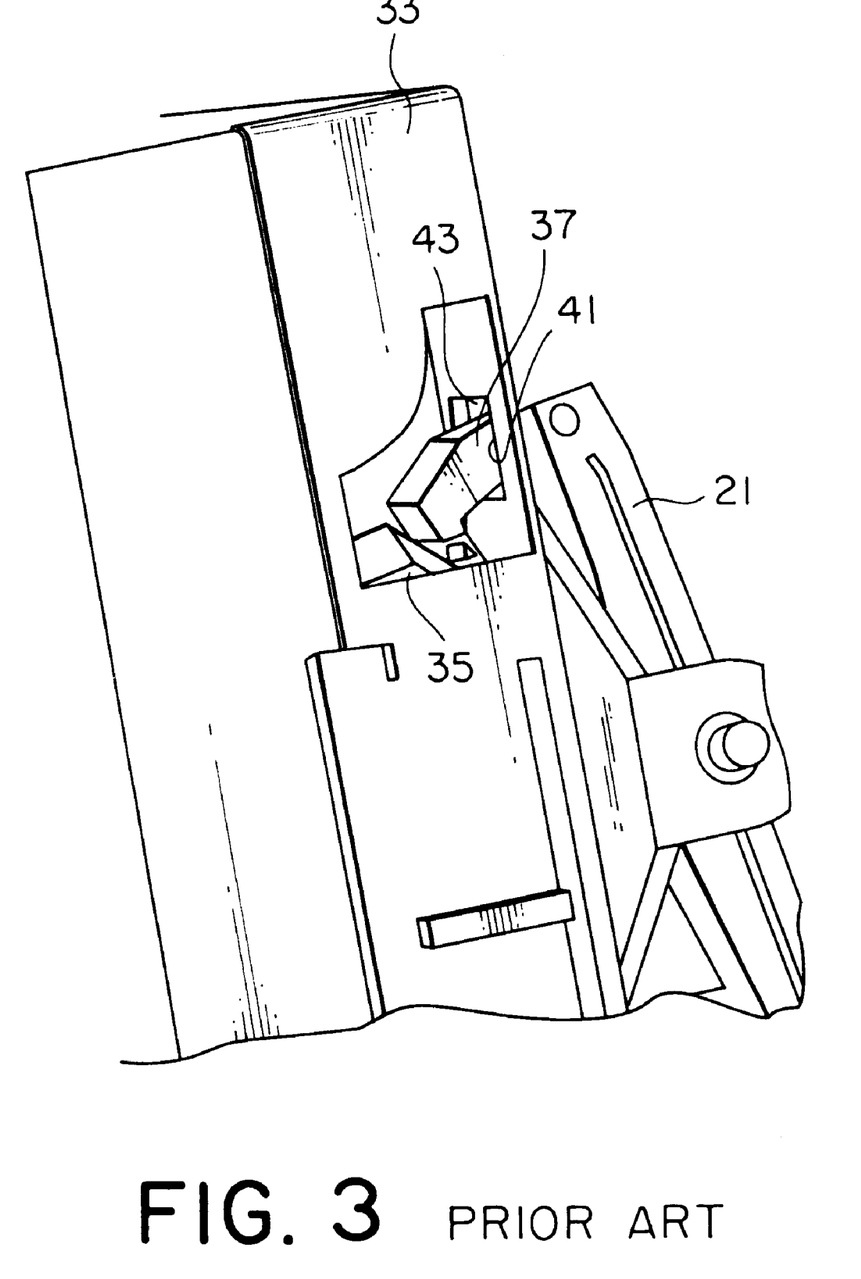
FIG. 3 is a perspective view, partly cut away, showing the state of the reel hub lock releasing mechanism in the case where the prior-art reel hub lock mechanism is in the reel hub lock releasing state.

Referring to FIGS. 1 through 3, a reel hub lock releasing mechanism 11 in the prior art is arranged on the rear side of a chassis 17 which forms the base of a tape drive. The mechanism 11 includes a release lever 12 which extends in the direction A of inserting a tape cartridge 33, and in parallel with an unshown left receiver forming a left guide with respect to the inserting direction A. The release arm 12 is turnably arranged on the chassis 17 with its central part as a fulcrum 15, and it is of seesaw type which has first and second flat members 19 and 21 extending onto both sides from the fulcrum 15. The fulcrum 15 is cylindrical.

More specifically, the chassis 17 has a tongue piece which is bent at right angles downwards, in the vicinity of the inner side of the unshown left receiver. Besides, the fulcrum 15 of the release lever 12 is rotatably arranged between the tongue piece and an unshown left side surface which is bent at right angles downwards at the left edge of the chassis 17. The fulcrum 15 extends in a direction which is orthogonal to the inserting direction A. A spring urges the fulcrum 15 toward the unshown tongue piece and is arranged at the outer periphery of the fulcrum 15. The spring serves to prevent the component from falling, for the purpose of enhancing the assemblability of the reel hub lock releasing mechanism 11.

The fulcrum 15 of the release lever 12 is always urged outwards, thereby to prevent the release lever 12 from falling off the chassis 17.

The first flat member 19 extends onto a deeper side than the fulcrum 15 in the inserting direction A, while the second flat member 21 extends this side of the fulcrum 15 in the inserting direction A. The first flat member 19 has at its distal end 23 an engaging protrusion 29 which engages with the cam groove 27 of a ring cam 25. On the other hand, the second flat member 21 has at its distal end 31 a lever manipulating protrusion 37 which protrudes upwards in order to manipulate the lock lever 35 of the tape cartridge 33. The lever manipulating protrusion 37 is protrusible onto the front side of the chassis 17 through an opening 39 which is provided in the chassis 17.

Incidentally, a loading mechanism includes an unshown loading motor which is arranged on the rear side of the chassis 17, and by which the ring cam 25 is driven. The ring cam 25 is coaxial with the rotary shaft of a supply reel motor, and it is rotatably arranged between the rear surface of the chassis 17 and the supply reel motor.

Next, the operation of the reel hub lock releasing mechanism 11 will be described with reference to FIGS. 1 and 2.

In a case where the reel hub lock mechanism (not shown) of the tape cartridge 33 is in a reel hub locking state as shown in FIG. 1, the engaging protrusion 29 of the release lever 12 lies in the upper groove of the cam groove 27 of the ring cam 25, and the lever manipulating protrusion 37 lies below.

Incidentally, FIG. 1 shows a state immediately after the tape cartridge 33 has been inserted into the tape cartridge inserting slot of the tape drive, and the loading mechanism is not operating yet in the state. In this state, as shown in FIG. 1, the lever manipulating protrusion 37 of the release lever 12 and the lock lever 35 of the tape cartridge 33 are spaced from each other.

After the tape cartridge 33 has been inserted into the slot of the tape drive, the loading mechanism operates in order to bring a supply reel (not shown) into engagement with the supply reel motor. More specifically, the loading motor operates to rotationally drive the ring cam 25 counterclockwise. Thus, the engaging protrusion 29 of the release lever 12 moves downward from the upper groove toward the lower groove of the cam groove 27 of the ring cam 25 along this groove 27. Accordingly, the lever manipulating protrusion 37 of the release lever 12 turns upwards round the fulcrum 15 until it engages with the lock lever 35 as shown in FIG. 2. Then, the reel hub lock of the tape cartridge 33 is released. Thus, it is permitted to pull out a magnetic tape wound round the supply reel of the tape cartridge 33, from this supply reel.

In this manner, the reel hub lock releasing mechanism 11 in the prior art is constructed of the seesaw type release lever 12. Accordingly, that engaging protrusion 29 of the release lever 12 which engages with the cam groove 27 of the ring cam 25 does not apply any load to the ring cam 25. Since a load on the ring cam 25 can be diminished in this way, the loading motor for driving the ring cam 25 may be a small-sized one, and the life thereof can be prolonged. Besides, since almost no frictional force is exerted on the cam groove 27 of the ring cam 25 by the engaging protrusion 29 of the release lever 12, friction can be diminished. Further, since the release lever 12 constructing the reel hub lock releasing mechanism 11 is of the seesaw type which is short in length and small in size, the miniaturization of the reel hub lock releasing mechanism 11 can be easily attained. In addition, since the reel hub lock releasing mechanism 11 is constructed of the seesaw type release lever 12, the number of components can be curtailed, and the assemblage can be simplified. As a result, it is also possible to reduce the cost of the reel hub lock releasing mechanism 11.

Referring to FIG. 3, the lever manipulating protrusion 37 of the release lever 12 of the prior-art reel block mechanism 11 engages with the lock lever 35 through a square window 41 which is provided so as to open near one side of the bottom of the tape cartridge 33. Such a tape cartridge 33 has the release lever of the reel hub lock mechanism 11 located on the drive side so as to prevent the tape from loosening during non-operation, and it includes a part for positioning itself, separately from the release lever.

Now, an embodiment of this invention will be described with reference to FIGS. 4 through 10.

Figure 4:
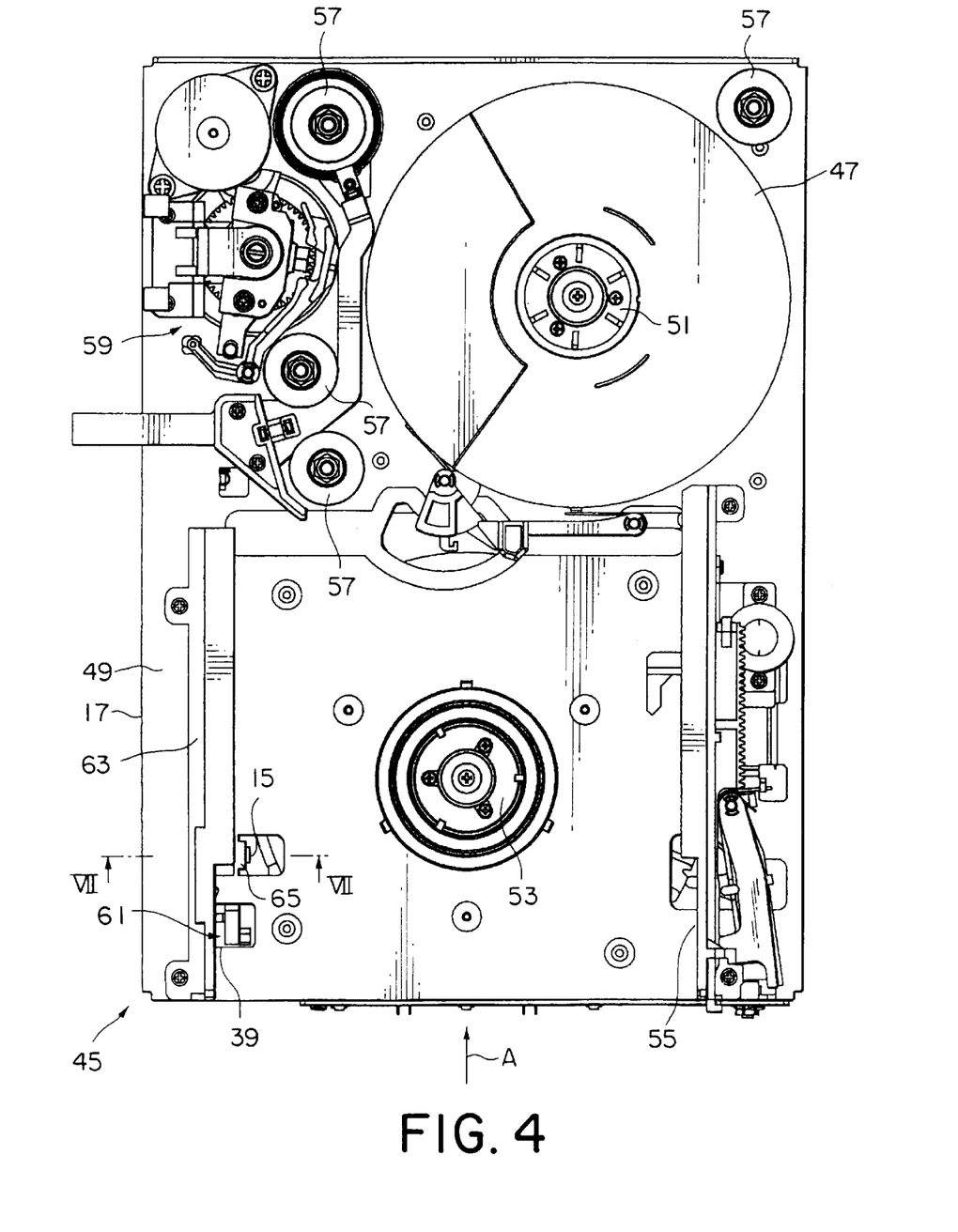
FIG. 4 is a plan view showing a tape drive which includes a reel hub lock releasing mechanism according to this invention, in a state where an upper cover is detached.

First, a tape drive which includes a reel hub lock releasing mechanism according to this invention will be described with reference to FIG. 4. Incidentally, the plan view of FIG. 4 shows the tape drive in a state where its upper cover is detached.

The tape drive 45 serves to receive a tape cartridge (not shown), and includes a take-up reel 47 therein. The take-up reel 47 is also called the "spool". The tape drive 45 includes a housing or chassis 17 which is substantially in the shape of a rectangular parallelepiped having a common base 49. The base 49 has two spindle motors or reel motors 51, 53. The first spindle motor 51 has the spool or take-up reel 47 permanently mounted on the base 49, and the spool 47 is dimensioned so as to accept a magnetic tape (not shown) streaming at a relatively high speed. The second spindle motor or reel motor 53 is adapted to receive the removable tape cartridge. The removable tape cartridge is manually or automatically inserted into the drive 45 through a slot 55 formed in the housing 17 of the drive 45, and along the direction of the insertion indicated by an arrow A. The first spindle motor 51 is called the "take-up reel motor", while the second spindle motor 53 is called the "supply reel motor" which forms supply reel drive means.

When the tape cartridge is inserted into the slot 55, the tape cartridge is engaged with the second spindle motor or supply reel motor 53 by a loading mechanism to be stated later. Before the first and second spindle motors or reel motors 51, 53 are rotated, the tape cartridge is connected to the permanently mounted spool or take-up reel 47 by a mechanical buckling mechanism (not shown). A large number of rollers or guide rollers 57 located between the tape cartridge and the permanent spool 47 guide the magnetic tape as it moves at a relatively high speed back and forth between the tape cartridge and the permanently mounted spool 47. Incidentally, the housing 17 is constructed of a pressed plate chassis which is made of a ferric magnetic substance.

The tape drive 45 further includes a magnetic tape head actuator assembly, hereinafter, also simply called "actuator assembly" 59. The actuator assembly 59 is located between the take-up spool 47 and the tape cartridge along a tape path (not shown) defined by the plurality of rollers 57. During operation, the magnetic tape streams back and forth between the take-up spool 47 and the tape cartridge, and it comes into close proximity to the actuator assembly 59 while streaming along the defined tape path.

The reel hub lock releasing mechanism 61 according to this invention is arranged in the vicinity of the inner side of the left wall or left receiver 63 of the tape drive 45 as shown in FIG. 4.

Incidentally, although no illustration is made, the tape cartridge includes a reel hub lock mechanism therein as stated before. The reel hub lock mechanism is a mechanism for locking the reel hub of a supply reel, in other words, for effecting reel hub lock. The reel hub lock mechanism includes a lock lever for making the reel hub lock releasable through an external manipulation. The lock lever is disposed in proximity to the left hinder corner of the tape cartridge, and is arranged at a position which can be seen from outside through an opening provided in the lower surface of the case of the tape cartridge.

Next, the reel hub lock releasing mechanism 61 according to one embodiment of this invention will be described with reference to FIGS. 5 through 9.

Referring to FIGS. 5 through 9, the reel hub lock releasing mechanism 61 is arranged on the rear side of the chassis 17. The mechanism 61 includes a release lever 12 which extends in the inserting direction A and in parallel with the left receiver 63. The release arm 12 is turnably arranged on the chassis 17 with its central part as a fulcrum 15. The release arm 12 is of seesaw type which has first and second flat members 19 and 21 extending onto both sides from the fulcrum 15. The fulcrum 15 is cylindrical.

Figure 5:
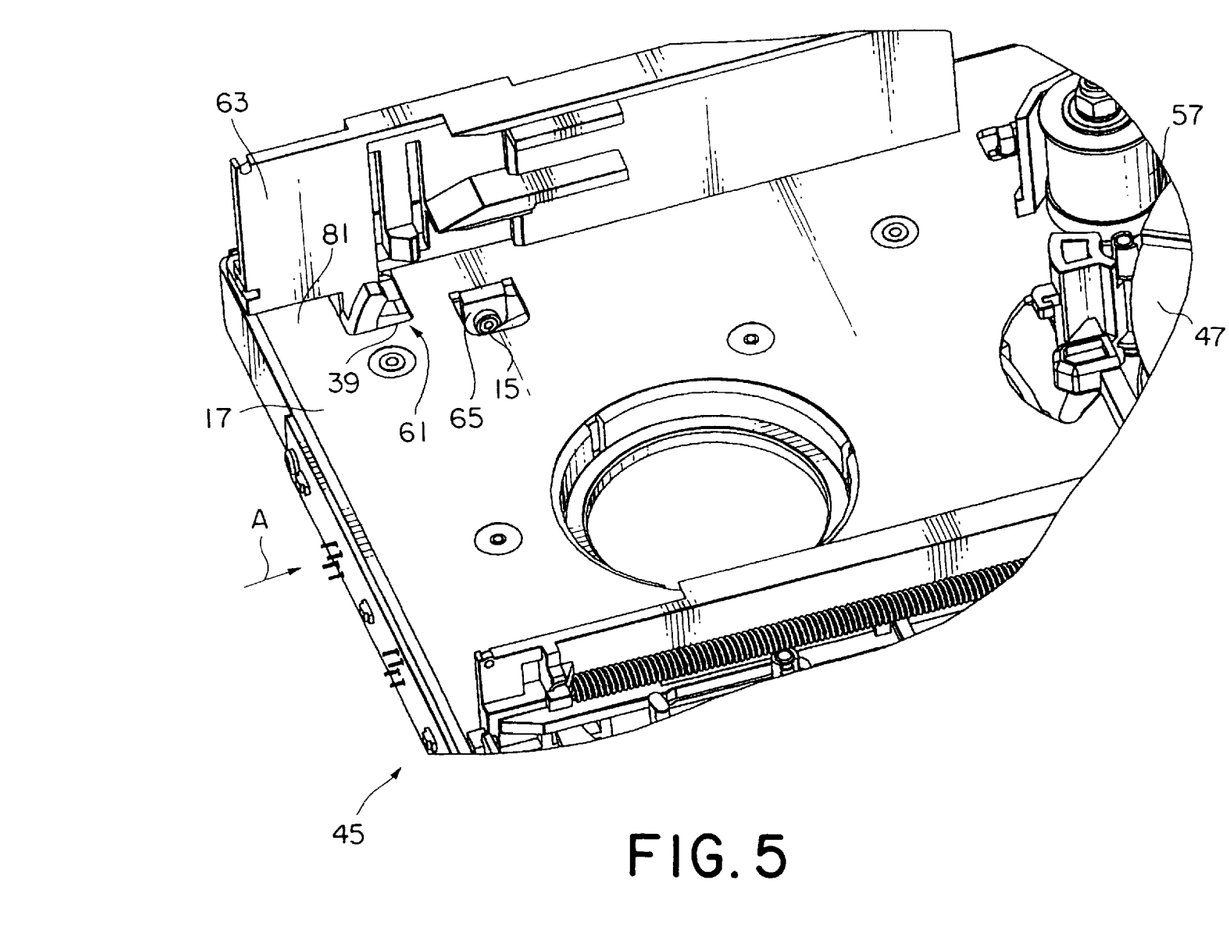
FIG. 5 is a perspective view in which the principal parts of the tape drive including the reel hub lock releasing mechanism according to an embodiment of this invention are obliquely seen from the front side of the tape drive.
Figure 7:
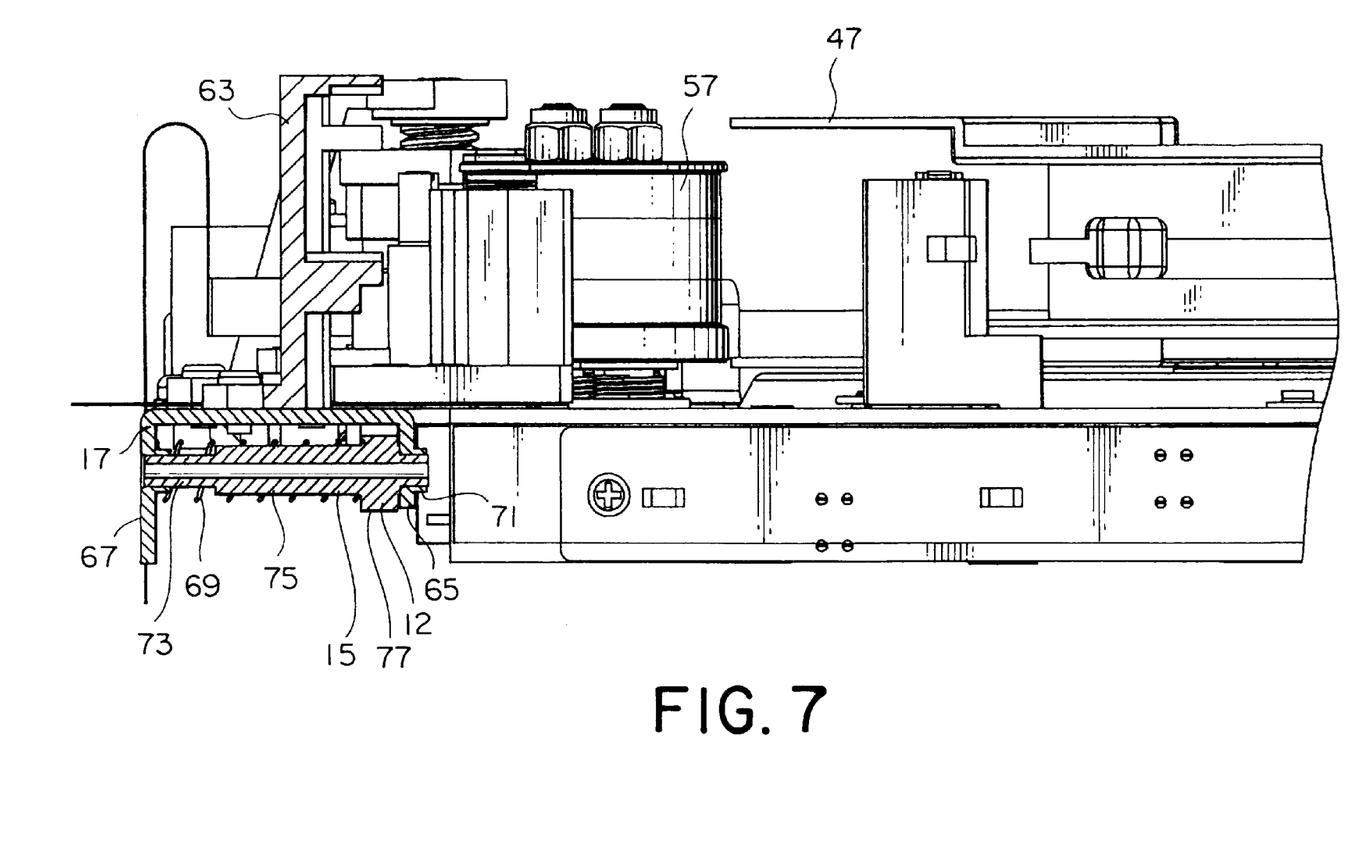
FIG. 7 is a sectional view taken along line VII—VII in FIG. 4.

More specifically, as shown in FIG. 5, the chassis 17 has a tongue piece 65 which is bent at right angles downwards, in the vicinity of the inner side of the left receiver 63. Besides, as shown in FIG. 7, the fulcrum 15 of the release lever 12 is rotatably arranged between the tongue piece 65 and a left side surface 67 which is bent at right angles downwards at the left edge of the chassis 17. The fulcrum 15 extends in a direction which is orthogonal to the inserting direction A. A spring 69 urges the fulcrum 15 toward the tongue piece 65 and is arranged at the outer periphery of the fulcrum 15. The spring 69 serves to prevent the component from falling, for the purpose of enhancing the assemblability of the reel hub lock releasing mechanism 61.

As shown in FIG. 7, the fulcrum 15 of the release lever 12 consists of a first inserting cylinder portion 71, a second inserting cylinder portion 73, an intermediate cylinder portion 75, and an engaging cylinder portion 77.

The first inserting cylinder portion 71 is inserted in a hole provided in the tongue piece 65. The second inserting cylinder portion 73 is inserted in a hole provided in the left side surface and is somewhat long. The intermediate cylinder portion 75 extends toward the tongue piece 65 in continuation to the second inserting cylinder portion 73. The engaging cylinder portion 77 extends between the intermediate cylinder portion 75 and the first inserting cylinder portion 71.

The outside diameters of the cylinder portions 71, 73, 75, 77 have the following relations. The outside diameters of the first inserting cylinder portion 71 and the second inserting cylinder portion 73 are equal. The outside diameter of the intermediate cylinder portion 75 is larger than that of the second inserting cylinder portion 73. The outside diameter of the engaging cylinder portion 77 is larger than that of the intermediate cylinder portion 75. Besides, the spring 69 has a diameter which is intermediate between the outside diameters of the intermediate cylinder portion 75 and the engaging cylinder portion 77. As shown in FIG. 7, accordingly, the spring 69 is fitted between the engaging cylinder portion 77 and the left side surface 67, thereby to always urge the fulcrum 15 toward the tongue piece 65. Thus, the release lever 12 is prevented from falling off the chassis 17.

Figure 6:
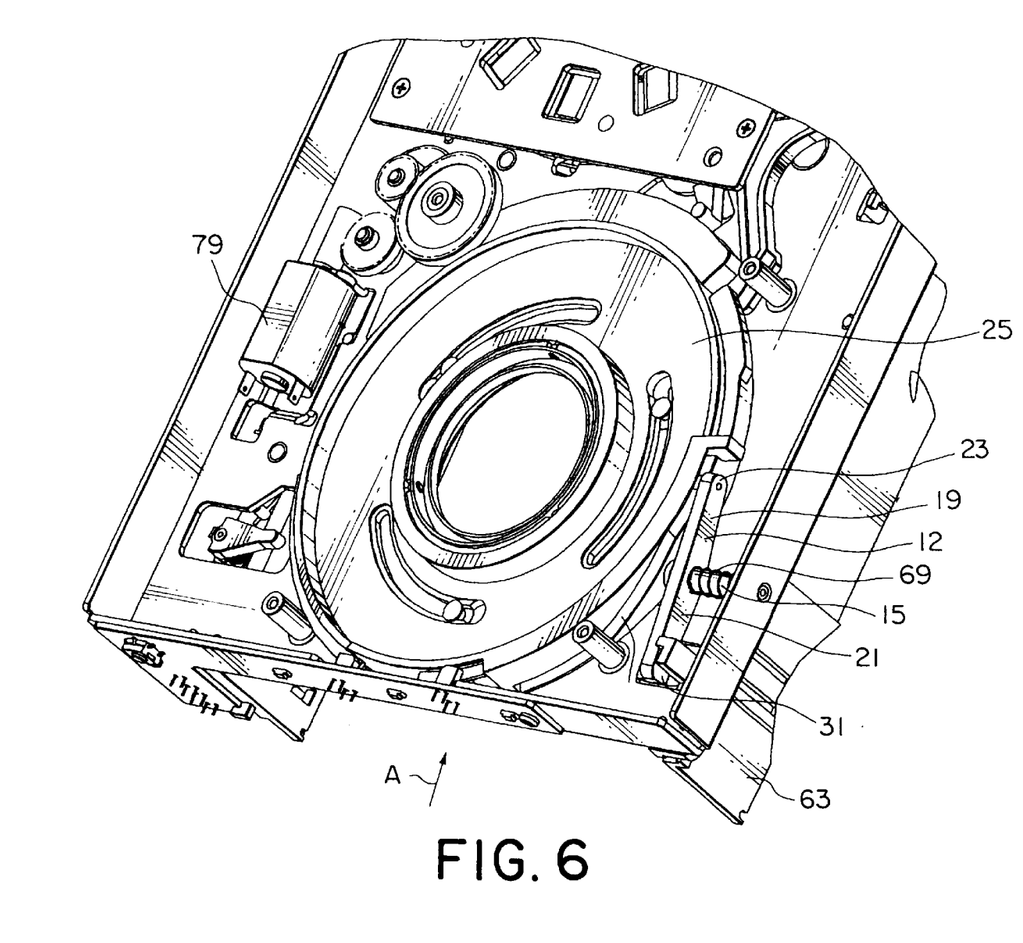
FIG. 6 is a perspective view in which the principal parts of the tape drive including the reel hub lock releasing mechanism as shown in FIG. 5 are obliquely seen from the rear side of the tape drive.

The first flat member 19 extends onto a deeper side than the fulcrum 15 in the inserting direction A, while the second flat member 21 extends this side of the fulcrum 15 in the inserting direction A. The first flat member 19 has at its distal end 23 an engaging protrusion 29 which engages with the cam groove 27 of a ring cam 25. On the other hand, the second flat member 21 has at its distal end 31 a lever manipulating protrusion 81 which protrudes upwards in order to manipulate the lock lever 35 of the tape cartridge 33. The lever manipulating protrusion 81 is protrusible onto the front side of the chassis 17 through an opening 39 which is provided in the chassis 17.

Incidentally, the loading mechanism includes a loading motor 79 which is arranged on the rear side of the chassis 17, and by which the ring cam 25 is driven. The ring cam 25 is coaxial with the rotary shaft of the supply reel motor 53 (FIG. 4). The ring cam 25 is rotatably arranged between the rear surface of the chassis 17 and the supply reel motor 53.

Next, the operation of the reel hub lock releasing mechanism 61 will be described with reference to FIGS. 8, 9 and 10.

Figure 8:
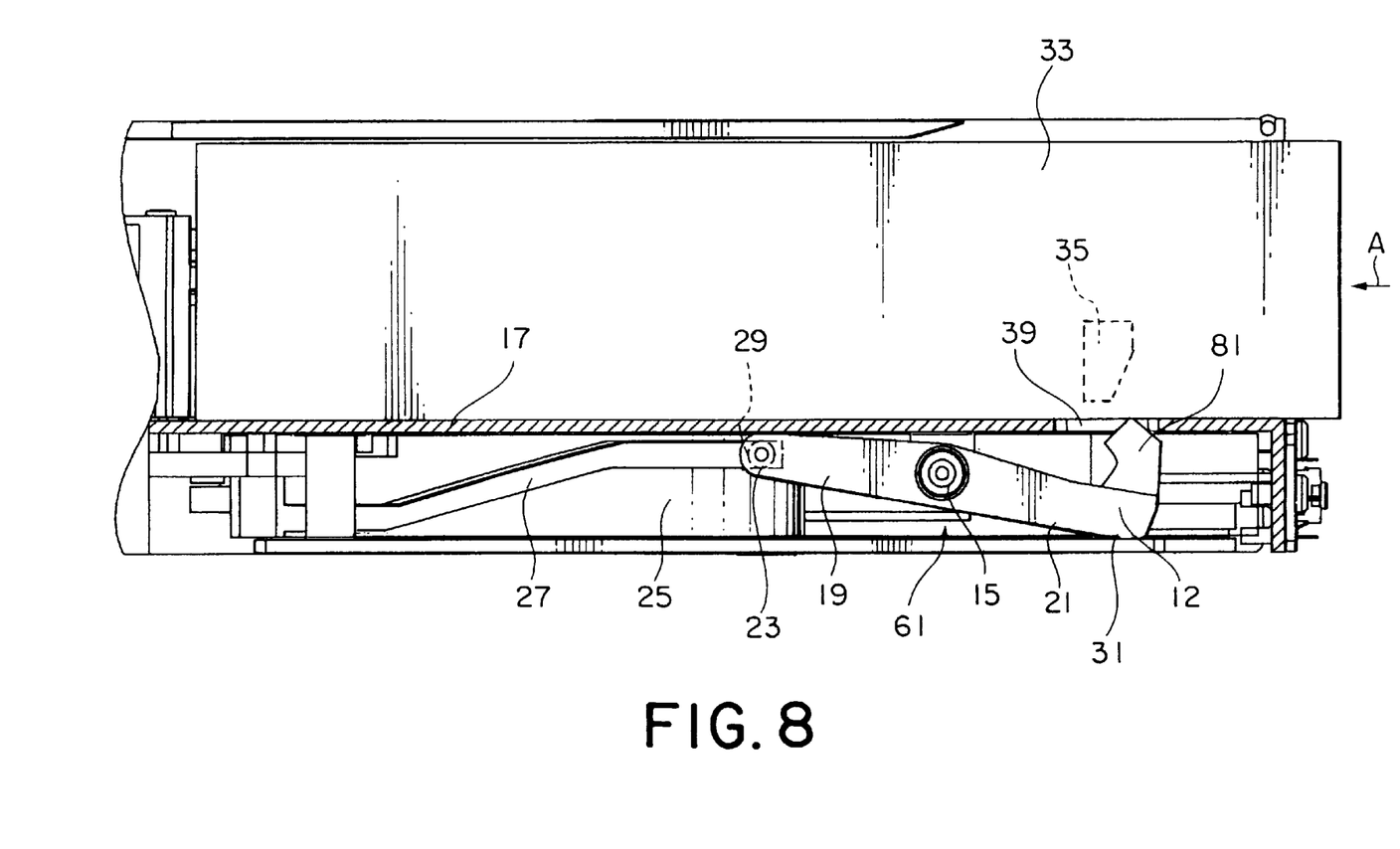
FIG. 8 is a sectional view showing the state of the reel hub lock releasing mechanism shown in FIG. 5, in the case where a reel hub lock mechanism is in a reel hub locking state.
Figure 9:
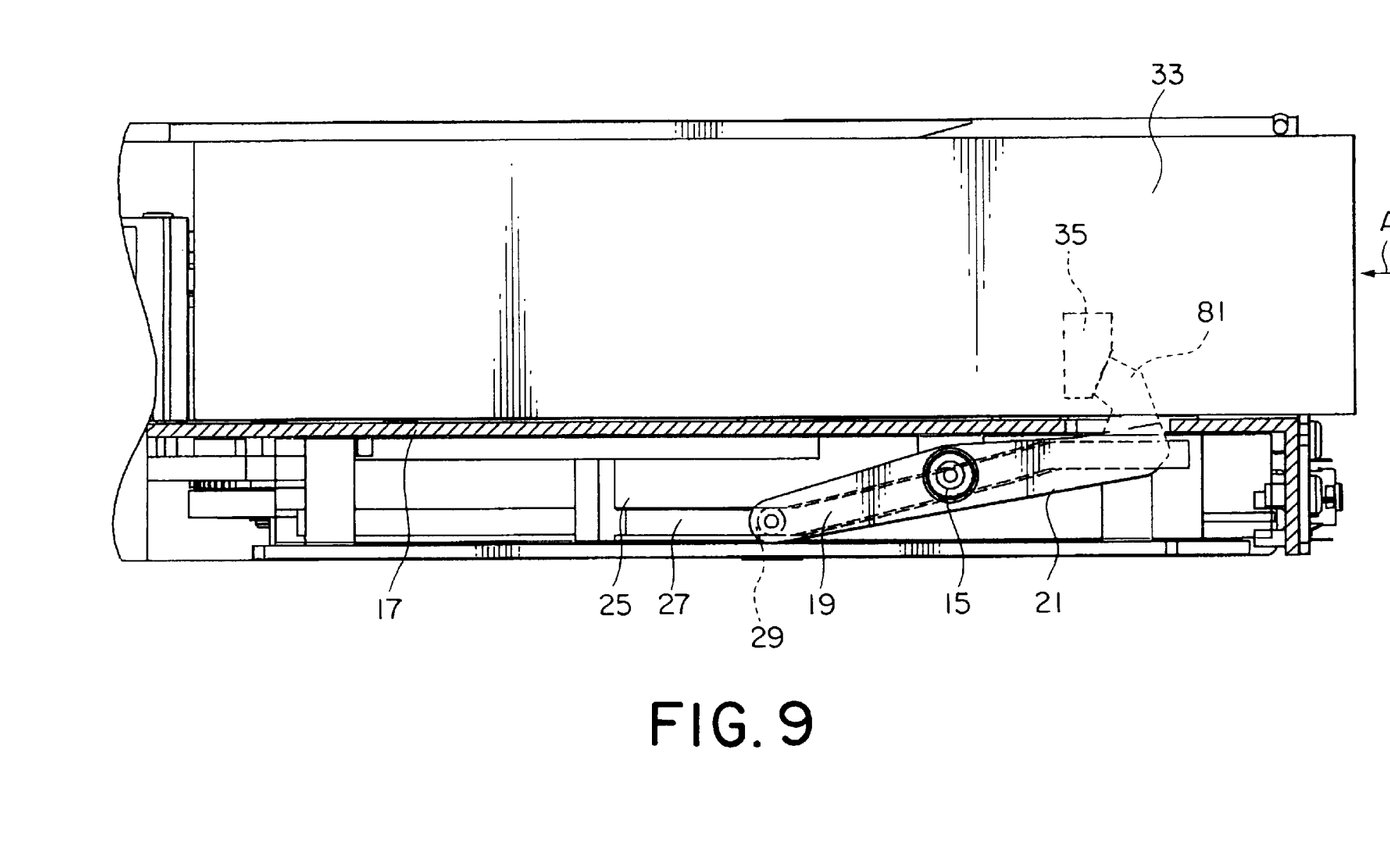
FIG. 9 is a sectional view showing the state of the reel hub lock releasing mechanism shown in FIG. 2, in the case where the reel hub lock mechanism is in a reel hub lock releasing state.

In a case where the reel hub lock mechanism (not shown) of the tape cartridge 33 is in a reel hub locking state as shown in FIG. 8, the engaging protrusion 29 of the release lever 12 lies in the upper groove of the cam groove 27 of the ring cam 25, and the lever manipulating protrusion 81 lies below.

Incidentally, FIG. 8 shows a state immediately after the tape cartridge 33 has been inserted into the slot 55 (FIG. 4) of the tape drive 45, and the loading mechanism is not operating yet in the state. FIG. 9 shows a lock releasing operation after the loading mechanism has operated. Besides, FIG. 10 is a partial enlarged perspective view, partly cut away, showing the engagement between the lever manipulating protrusion 81 and the lock lever 35.

In the state shown in FIG. 8, the lever manipulating protrusion 81 of the release lever 12 and the lock lever 35 of the tape cartridge 33 are spaced from each other.

After the tape cartridge 33 has been inserted into the slot 55 of the tape drive 45, the loading mechanism operates in order to bring a supply reel (not shown) into engagement with the supply reel motor 53 (FIG. 4). More specifically, the loading motor 79 (FIG. 6) operates to rotationally drive the ring cam 25 counterclockwise. Thus, the engaging protrusion 29 of the release lever 12 moves downward from the upper groove toward the lower groove of the cam groove 27 of the ring cam 25 along this groove 27. Accordingly, the lever manipulating protrusion 81 of the release lever 12 turns upwards round the fulcrum 15. The protrusion 81 is snugly inserted through the opening 39 as well as the unshown window of the tape cartridge 33 until the protorusion engages with the lock lever 35 as shown in FIG. 9. Then, the reel hub lock of the tape cartridge 33 is released. Thus, it is permitted to pull out the magnetic tape wound round the supply reel of the tape cartridge 33, from this supply reel.

Figure 10:
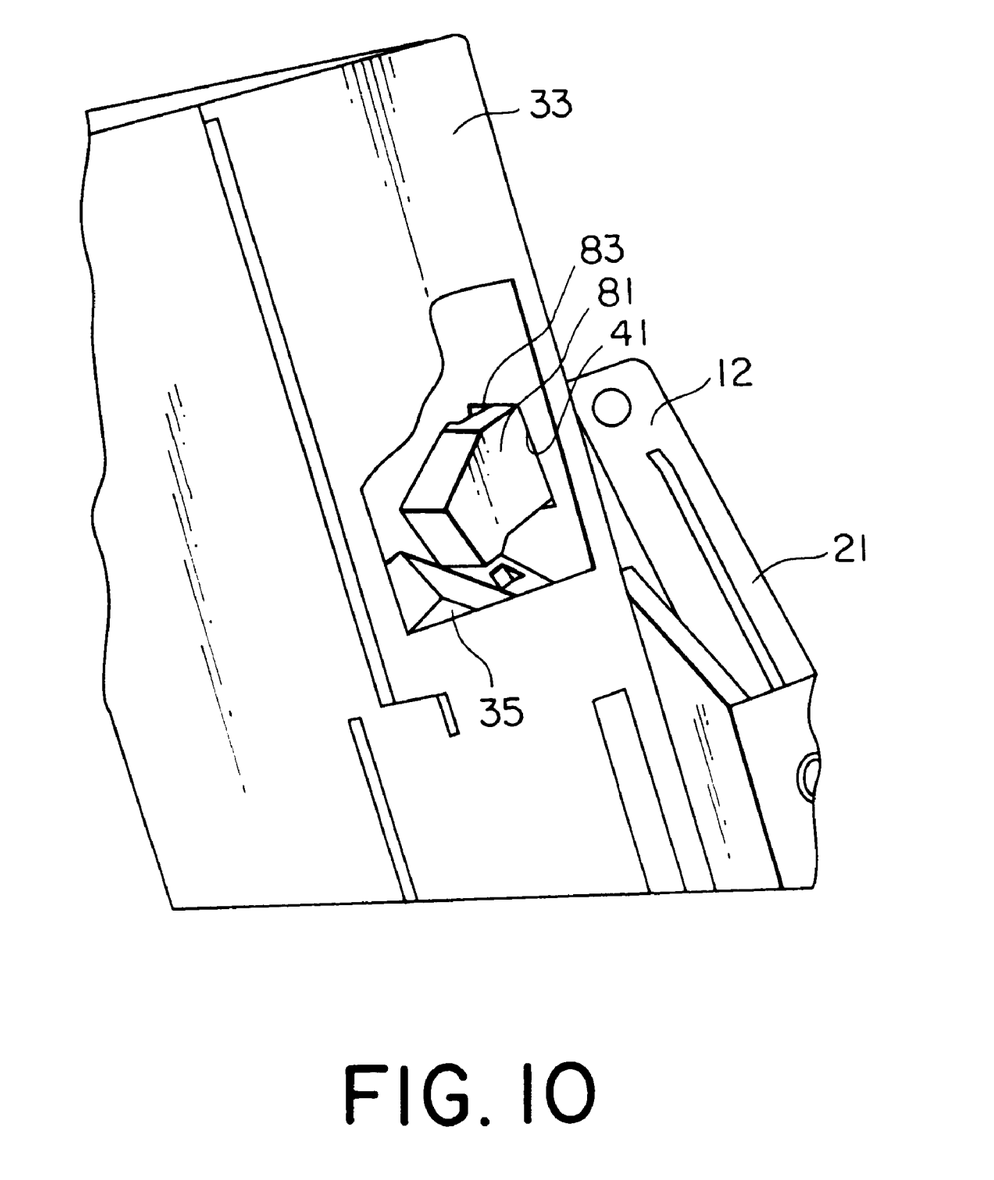
FIG. 10 is a perspective view, partly cut away, showing the state of the reel hub lock releasing mechanism in the case where the reel hub lock mechanism is in the reel hub lock releasing state.

As shown in FIG. 10, when the manipulating protrusion 81 of the release lever 12 and the lock lever 35 of the tape cartridge 33 have come into engagement, the former 81 lies at a position at which it passes through the window 41 of the tape cartridge 33. Since, however, the geometries of the window 41 and those of the cross section of the protrusion 81 are designed substantially the same, and hence, a gap 83 hardly appears. Therefore, the positioning of the tape cartridge 33 in the depthwise direction thereof can be simultaneously effected.

As understood from the above description, according to this invention, the lock release and the position control can be effected by the single lever. It is therefore possible to provide that reel hub lock mechanism of the tape cartridge which can prevent the tape cartridge from moving due to a force for the lock release and consequently the lock release from becoming unstable.

What is claimed is:

1. A reel hub lock releasing mechanism for a tape drive having supply reel drive means for rotationally driving a supply reel included in a tape cartridge inserted into a slot and a loading mechanism connected to the supply reel drive means, the loading mechanism driving a ring cam after the tape cartridge has been inserted into the slot, the reel hub lock releasing mechanism making a reel hub lock of the supply reel release so as to become rotatable when the tape cartridge has been inserted into the slot and comprising:

a lock lever disposed in the tape cartridge for making the reel hub lock releasable through an external manipulation, the lock lever being manipulated in response to turning of the ring cam when the tape cartridge has been inserted into the slot; and a seesaw type release lever arranged so as to be turnable with its central part as a fulcrum and including first and second flat members extending onto both sides from the fulcrum, the first flat member having an engaging protrusion at a distal end, while the second flat member has at a distal end a lever manipulating protrusion which protrudes upwards in order to manipulate the lock lever, the tape cartridge being formed with a window for snugly inserting the lever manipulating protrusion, the lever manipulating protrusion abutting against the lock lever through the window, thereby to perform the lock releasing operation, and to simultaneously position the tape cartridge so that a position of the window in a direction of inserting the tape cartridge into the slot may become substantially equal to a position of the lever manipulating protrusion in the inserting direction.

2. A reel hub lock releasing mechanism as defined in claim 1, wherein the window is formed in one surface side of the tape cartridge, the lever manipulating protrusion being disposed in the tape drive so as to oppose to the window when the tape cartridge has been inserted into the tape drive.

3. A reel hub lock releasing mechanism as defined in claim 2, wherein the seesaw type release lever is driven by a loading motor of the loading mechanism.

4. A tape drive having a reel hub lock releasing mechanism including supply reel drive means for rotationally driving a supply reel included in a tape cartridge inserted into a slot, and a loading mechanism connected to the supply reel drive means for driving a ring cam after the tape cartridge has been inserted into the slot, the reel hub lock releasing mechanism making a reel hub lock of the supply reel release so as to become rotatable when the tape cartridge has been inserted into the slot and comprising a lock lever disposed in the tape cartridge for making the reel hub lock releasable through an external manipulation, the lock lever being manipulated in response to turning of the ring cam when the tape cartridge has been inserted into the slot, wherein the reel hub releasing mechanism comprises a seesaw type release lever arranged so as to be turnable with its central part as a fulcrum, and including first and second flat members extending onto both sides from the fulcrum, the first flat member having an engaging protrusion at a distal end, while the second flat member has at a distal end a lever manipulating protrusion which protrudes upwards in order to manipulate the lock lever, the tape cartridge being formed with a window for snugly inserting the lever manipulating protrusion, the lever manipulating protrusion abutting against the lock lever through the window, thereby to perform the lock releasing operation, and to simultaneously position the tape cartridge so that a position of the window in a direction of inserting the tape cartridge into the slot may become substantially equal to a position of the lever manipulating protrusion in the inserting direction.

\* \* \* \* \*